May 31, 1960 G. H. FATHAUER 2,939,042

AUTOMATIC FOCUSING CIRCUIT

Filed Jan. 16, 1958

Inventor
George H. Fathauer
by Hill Sherman Meroni Gross & Simpson Attys

United States Patent Office 2,939,042

Patented May 31, 1960

2,939,042

AUTOMATIC FOCUSING CIRCUIT

George H. Fathauer, Decatur, Ill., assignor to Thompson Ramo Wooldridge Inc., a corporation of Ohio Filed Jan. 16, 1958, Ser. No. 709,294

7 Claims. (Cl. 315—31)

This invention relates to an electrical circuit for automatically focusing the beam of an electron beam device. More particularly, this invention relates to a circuit for automatically maintaining in focus the electron beam of a television camera tube when the voltages or currents supplied to said tube change due to changes in ambient or other operating conditions, or to changes in the line voltage from which the power supply for the tube is operated.

The electron beam of devices such as a television camera tube is commonly focused to a scanning spot on the image-sensitive screen of the tube, either by an electrostatic focusing electrode or by magnetic focusing means, or by a combination of the two. If the magnitude of the voltage supplied to an electrostatic focusing electrode, or the magnitude of the current supplied to a magnetic focusing coil varies during the operation of the tube, it is apparent that the beam will become defocused, thereby resulting in loss of resolution and picture distortion. In the past this problem has been dealt with either by using a highly regulated power supply to operate the focusing means, or by using a permanent magnet to focus the beam. Power supplies exhibiting a high degree of regulation are, however, unduly expensive. Furthermore, no such power supply ever achieves perfect regulation. It has also been found that permanent magnets do not supply an absolutely constant field, especially when subjected to shocks and vibrations and, in addition, the use of a permanent magnet results in a lack of flexibility of focusing adjustment.

It is, therefore, an object of this invention to provide an electrical circuit for automatically maintaining the beam of an electron beam device in focus, independently of changes in ambient operating conditions, or of any changes in the characteristics of the power supply to said device.

It is a further object of this invention to provide an electrical circuit for automatically focusing the electron beam of a television camera tube which circuit overcomes the above-noted problems associated with known techniques.

It is a still further object of this invention to provide an electrical circuit which overcomes any defocusing tendency created by any change in the power supplied to a magnetic focusing means by sensing this change and applying a compensating change in the power supplied to an electrostatic focusing means.

It is still another object of this invention to provide an electrical compensating circuit which permits the use of an unregulated power supply for operating the focusing, accelerating and deflection system of an electron beam device such as a television camera tube in order to maintain the beam in focus and to maintain a correct raster size.

Briefly, in accordance with one aspect of this invention, a television camera tube is provided with both a coil to produce magnetic focusing action and an electrode to produce electrostatic focusing action. The coil is connected through a current-sensing resistor and a potentiometer to a power supply which may be of an inexpensive, unregulated type. The voltage signal developed across the current-sensing resistor is applied to a stabilized amplifier, the output of which is applied to the electrostatic focusing electrode so as to compensate for any change in focusing resulting from a change in the current supplied to the magnetic focusing coil. The beam is thus maintained in focus, independently of any change in ambient or operating conditions.

While the novel and distinctive features of the invention are particularly pointed out in the appended claims, a more expository treatment of the invention in principle and in detail, together with additional objects and advantages thereof, is afforded by the following description and accompanying drawings, in which:

Figures 1, 2:
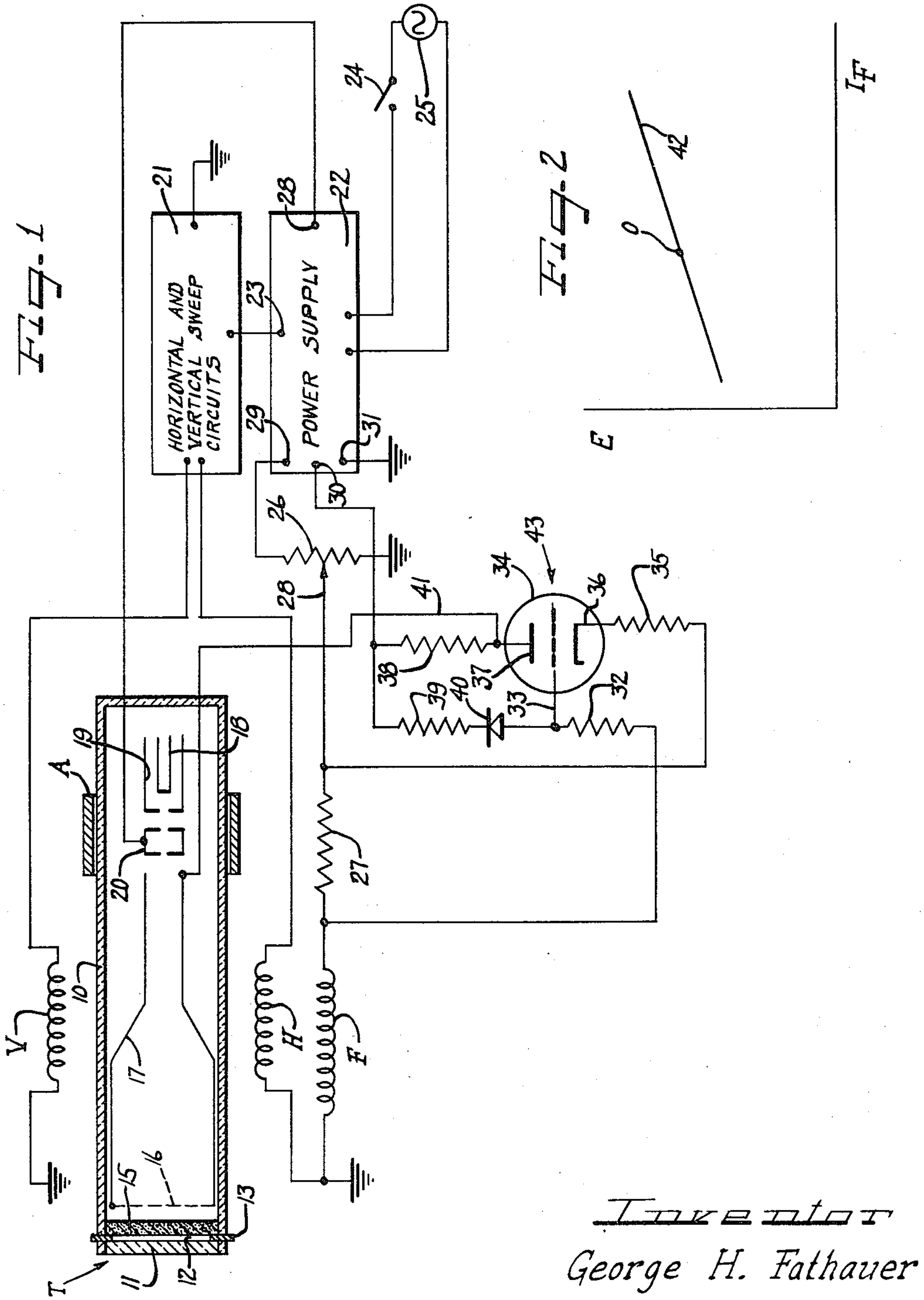
Figure 1 is a block schematic circuit diagram of an automatic focusing circuit as applied to a television camera tube.
Figure 2 is a graph illustrating the operation of the circuit and showing the relationship necessary between the current supplied to the magnetic focusing coil plotted as abscissa and the voltage supplied to the electrostatic focusing electrode plotted as ordinate to maintain the beam in focus.

Turning now to the drawings and in particular to Figure 1 thereof, the structure of the circuit will first be described before discussing its mode of operation. A conventional photo-conductive television camera tube, T, may, for example, comprise a tube envelope 10 having a transparent face plate 11 mounted at one end thereof. A thin transparent conducting film 12 on the inner surface of the face plate is commonly designated a signal electrode and is adapted to be connected to external video signal output circuitry through a terminal 13. A light-sensitive element consisting of a thin layer of photoconductive material 15 is deposited on the signal electrode, the thickness being greatly exaggerated in the drawing. A fine mesh screen or grid 16 is located adjacent to the photoconductive layer 15 and is electrically connected to an electrostatic focusing electrode 17. An electron gun is positioned in the opposite end of the tube and consists of a thermionic cathode 18, a beam intensity control grid 19, and an accelerating grid 20. A voltage of a magnitude appropriate for the particular tube being used is applied to accelerating electrode 20 from terminal 28 of the main power supply 22. Appropriate voltages are applied to cathode 18 and intensity control grid 19 by any conventional means (not shown). The gun side of the photoconductive layer is thus scanned by a low velocity electron beam produced by the electron gun.

The beam is focused to a spot on the surface of the photoconductive layer by the combined action of the uniform magnetic field of an external coil shown schematically as coil F in Figure 1, and by the electrostatic field of electrode 17. Grid 16 serves to provide a uniform decelerating field between itself and the photoconductive layer so that the electron beam will approach the layer in a direction perpendicular to it in order to drive the photoconductive surface to cathode potential. The beam is deflected in a regular scanning pattern across the surface of photoconductive layer 15 by any conventional horizontal and vertical deflecting means such as external coils H and V to which an appropriate deflection signal may be applied from the horizontal and vertical sweep circuits 21. Alignment of the beam may be accomplished by a transverse magnetic field produced either by an external permanent magnet A or an equivalent coil located at the base end of the focusing coil.

Sweep circuits 21 derive power from an output terminal 23 of power supply 22. Power supply 22 is connected through a switch 24 to a source of alternating current power 25, which may conveniently be line current, and is adapted to supply a plurality of D.-C. voltages required to operate the tube and its associated circuitry at the various output terminals 23, 28, 29, and 30. Power supply 22 is also provided with a common ground return terminal 31.

Output terminal 29 is connected through a potentiometer 26 and current sensing resistor 27 to one end of magnetic focusing coil F, the other end of which is returned to the power supply through a ground connection. The wiper arm 28 of potentiometer 26 may be adjusted to initially adjust the focus of the electron beam. The voltage drop across current sensing resistor 27 is applied to an amplifier circuit 43 which may comprise either a vacuum tube, a transistor, or any other suitable active device. As illustrated by way of example in Fig. 1, the junction point of resistor 27 and coil F is connected through a resistor 32 to the grid 33 of an amplifier tube such as triode 34. The other end of resistor 27 is connected through a stabilizing resistor 35 to the cathode 36 of tube 34. Plate 37 of tube 34 is connected through load resistor 38 to terminal 30 of power supply 22. Terminal 30 is also connected through a resistor 39 and reverse biased Zener diode 40, or any other suitable constant voltage device, back to grid 33 of tube 34. Resistor 39, diode 40 and resistor 32 form a feed-back voltage divider which serve to stabilize the gain of amplifier tube 34 in the presence of any possible variation in power supply output voltage at terminal 30. The output of amplifier 34 is directly applied over line 41 to the electrostatic focusing electrode 17.

In the normal operation of the tube T, the beam of electrons generated by the electron gun is focused to a spot on the photoconductive layer 15 through the combined action of electrostatic focusing electrode 17 and magnetic focusing coil F. The initial energy of this beam is determined by the potential applied to accelerating electrode 20 which, in this particular type of tube, is generally set to produce a relatively low velocity electron beam. The beam is further decelerated by the field between grid 16 and signal electrode 12 and is swept across the surface of the photoconductive layer 15 in a conventional television raster by saw-tooth deflection signals applied to horizontal and vertical deflection coils H and V. Each element of the photoconductive layer is an insulator in the dark, but becomes slightly conductive when it is illuminated. When illuminated, each element acts like a leaky capacitor having one plate at the fixed positive potential of the signal electrode and the other plate floating. When light from the scene being televised is picked up by an optical lens system (not shown) and focused on the photoconductive layer surface next to the face plate, each illuminated element of the layer conducts slightly, depending upon the intensity of illumination of the element, and thus causes the potential of its opposite surface to rise in less than the time of one frame toward the potential of the signal electrode. Hence, there appears on the gun side of the entire photoconductive layer surface a positive potential pattern, composed of the various element potentials, corresponding to the pattern of light intensity from the scene imaged on the opposite surface of the layer.

When the gun side of the photoconductive layer is scanned by the electron beam, electrons are deposited from the beam in sufficient quantities to reduce the surface potential at each point to that of the cathode. This deposition of electrons on the various elements of the scanned surface causes a change in the difference of potential between the two surfaces of each element. Each element is thus, in effect, a charged capacitor. Hence, when the two surfaces of the element are connected through the external signal electrode circuit and the scanning beam, a capacitive current is produced which is used to derive the video output signal voltage across an external load resistor.

The focusing of the electron beam is affected both by the current $I_F$ through the focusing coil F and the potential E of the electrode 17. It has been found that if both $I_F$ and E are varied, while maintaining proper focus, a substantially linear relationship will be obtained as illustrated by the graph of Figure 2. The circuit of this invention functions to maintain this relationship.

In operation, the contact 28 of the potentiometer 26 may be adjusted to obtain operation at a point O as indicated in Figure 2. If the current through the coil F should increase, due to a change in the resistance of the coil or a change in the applied voltage, the voltage across the resistor 27 will increase to cause the potential of the grid 33 to shift in a negative direction relative to the cathode 36, to decrease the current through the resistor 38 and hence increase the potential of the electrode 17. A decreased current through the coil F will, of course, produce a decreased potential of the electrode 17.

The relationship between E and $I_F$ is, of course, controlled by the parameters of the circuit, i.e. the resistance of resistor 27, the amplification factor of the tube 34, the plate resistance of the tube 34, the resistance of resistor 38 and the resistance of the resistor 35, taking into account the amount of degeneration or negative feedback produced by resistor 35. It should be noted that the degeneration produced by resistor 35 is important in stabilizing the circuit.

The resistors 32 and 39 serve to compensate for variations in the output voltage of the power supply at terminal 30. If, for example, the voltage at terminal 30 should increase, it would tend to increase the potential of the plate 37. However, an increase in the potential of terminal 30 will also increase the potential of the grid 33, to thus increase current flow through the tube 34 and thus tend to decrease the potential of the plate 37. Exact compensation is obtained by making the ratio of the resistance of resistor 32 to the total resistance of resistors 32 and 39 equal to the reciprocal of the gain of the amplifier stage, so that a change in the voltage of terminal 30 will produce no net change in the voltage of the plate 37 or electrode 17.

The diode 40 is operated as a Zener diode, the voltage thereacross being constant, and it serves to provide the proper bias level at the grid 33 while at the same time permitting the use of resistor 32 and 39 of the proper relative values. The diode 40 might thus be replaced by a battery or other D.-C. source, but the diode is preferred in that a more constant voltagle is obtained, and in a simple and inexpensive manner. It is, of course, possible that the bias obtained from diode 40 might not be required in certain circuits depending upon the values of other components.

In a typical circuit, using an RCA Vidicon camera tube, Type 6198, the resistor 27 has a value of 1,000 ohms; the resistor 32 has a value of 27,000 ohms; the resistor 35 has a value of 2,700 ohms; the resistor 38 has a value of 47,000 ohms; the resistor 39 has a value of 180,000 ohms; the diode 40 is of a type providing a voltage drop of 18 volts; the triode 34 is one section of a type 12AT7 tube, and the voltage of terminal 30 is in the neighborhood of 250 volts. These values are given by way of illustrative example only, and are not to be construed as limitations.

It should be noted that means may be provided to permit a factory type adjustment of one or more of the resistors. However, once the proper values are obtained, the focus will automatically be maintained proper, and there is no need for further adjustment. The potentiometer 26 is adjusted only to obtain operation at approximately the center of the operating line 42, at average values of temperature, supply voltage, etc.

It should also be noted that the system of this invention not only maintains proper focus but also tends to maintain a constant raster size, irrespective of changes in ambient temperature, supply voltage, and similar variables. If, for example, the temperature should increase, it would tend to increase the resistance of both the focusing coil and the deflection coils, assuming wire such as copper having a positive temperature coefficient of resistance is used for both coils. An increase in the resistance of the deflection coils would tend to decrease the current flow therethrough and thus decrease the size of the raster. However, if an increase in the resistance of the deflection coils is accompanied by an increase in the resistance of the focus coil, the focus coil current is decreased and through the circuit of this invention, the potential of the focusing electrode is decreased to thus decrease the velocity and "stiffness" of the electron beam and thus tend to increase the size of the raster. In practice, the two effects compensate for one another, and a substantially constant raster size is obtained, irrespective of variations in temperature.

The same is true with respect to variations in the output of the power supply 22 since it is used for both the focus coil circuit and the sweep circuits 21.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are, therefore, intended to cover and embrace any such modifications within the limits only of the true spirit and scope of the invention.

I claim as my invention:

1. An automatic focusing circuit adapted for use with a television camera tube of the type having an image responsive screen mounted in one wall of a sealed envelope, means within said envelope to generate a beam of electrons, first magnetic means and second electrostatic means coacting to focus said beam to a spot on said screen, deflection means connected to cause said beam spot to scan said screen in a regular pattern, and power supply means connected to provide a unidirectional current to said magnetic focusing means and to provide unidirectional potentials to operate said tube; said automatic focusing circuit comprising, means to derive a signal voltage proportional to the current supplied to said magnetic focusing means, amplifier means responsive to said signal voltage connected to apply to said electrostatic focusing means a voltage the magnitude of which remains proportional to the magnitude of said current supplied to said magnetic focusing means independently of changes in the magnitude of said unidirectional current and of changes in the magnitude of said potentials provided by said power supply, said amplifier means comprising an electron discharge device having at least plate, cathode and grid electrodes, means to apply said signal to said grid electrode, an impedance element connecting said plate electrode to a first terminal of said power supply, means returning said cathode to a second terminal of said power supply, and a gain stabilizing voltage divider network connected in parallel with said plate-cathode circuit between said terminals of said power supply, said voltage divider network including a reverse biased diode, and said grid being connected to a predetermined point in said voltage divider network.

2. Apparatus for automatically focusing the electron beam of a television camera tube independently of changes in ambient operating conditions and of changes in the magnitude of the voltages supplied to said tube comprising, a power supply, a camera tube having an image responsive screen mounted in one wall thereof, means within said tube connected to generate a beam of electrons, deflection means connected to cause said beam to scan said screen in a regular pattern, current responsive magnetic focusing means and voltage responsive electrostatic focusing means coacting to focus said beam to a spot on said screen, said deflection means being connected to be operated by a voltage derived from said power supply, said magnetic focusing means being connected to derive a predetermined current from said power supply, means to derive a signal voltage having a magnitude linearly proportional to the magnitude of the current supplied to said magnetic focusing means, amplifier means connected to said power supply through a circuit including a biasing and stabilizing voltage divider network so as to linearly amplify said signal voltage independently of changes in the output of said power supply, and means to apply the output of said amplifier to said electrostatic focusing means to compensate for any change in the magnitude of the current supplied to said magnetic focusing means and maintain said beam in focus.

3. Apparatus for automatically focusing the electron beam of a television camera tube independently of changes in ambient operating conditions and of changes in the magnitude of the voltages supplied to said tube comprising, a power supply, a camera tube having an image responsive screen mounted in one wall of said tube, means within said tube connected to be actuated by said power supply to generate a beam of electrons, deflection means actuated by said power supply to cause said beam to scan said screen in a regular pattern, current responsive magnetic focusing means comprising a coil and a first resistor connected in series with said power supply, voltage responsive electrostatic focusing means comprising an electrode within said tube, amplifier means having first, second, and third electrodes, said first electrode being connected to said power supply through a second resistor, a voltage divider comprising third and fourth resistors and a constant voltage device connected in series between the junction point of said first resistor and said magnetic focusing coil and the electrical point at which said second resistor is connected to said power supply, said second electrode being connected to an electrical point between said third and fourth resistors, means connecting said third electrode of said amplifier means to the electrical point at which said first resistor is connected to said power supply, and means connecting said first electrode of said amplifier means to said electrostatic focusing electrode within said camera tube to apply the output voltage of said amplifier to said focusing electrode so as to maintain said beam in focus independently of any change in the current supplied to said magnetic focusing means.

4. In apparatus for automatically focusing the electron beam of a television camera tube of the type having current responsive magnetic focusing means and voltage responsive electrostatic focusing means independently of changes in ambient operating conditions and of changes in the magnitude of the voltages supplied to said tube from a power supply, the improvement comprising a first resistor connected in series circuit relationship with said current responsive magnetic focusing means and said power supply, amplifier means having first, second and third electrodes, said first electrode being connected to said power supply through a second resistor, a voltage divider comprising third and fourth resistors and a constant voltage device connected in series between the junction point of said first resistor and said magnetic focusing means and the electrical point at which said second resistor is connected to said power supply, said second electrode being connected to an electrical point between said third and fourth resistors, means connecting said third electrode of said amplifier means to the electrical point at which said first resistor is connected to said power supply, and means connecting said first electrode of said amplifier means to said electrostatic focusing means within said camera tube to apply the output voltage of said amplifier to said focusing electrode so as to maintain said beam in focus independently of any change in the current supplied to said magnetic focusing means or of any change in the output of said power supply.

5. Apparatus for stabilizing the gain of an amplifier stage to be independent of variations in power supply voltage comprising, an electron discharge device having at least plate, cathode and grid electrodes, means to apply a signal to be amplified to said grid electrode, an impedance element connecting said plate electrode to a first terminal of a power supply, means to derive an amplified output signal from said plate electrode, means returning said cathode to a second terminal of said power supply, and a gain stabilizing voltage divider network connected in parallel with said plate-cathode circuit between said terminals of said power supply, said voltage divider network comprising a first resistance and a reverse biased diode connected between said first terminal and said grid electrode and a second resistance connected between said electrode and said second terminal, the ratio of said second resistance to the sum of said first and second resistances being proportional to the reciprocal of the gain of said stage.

6. Apparatus for automatically focusing the electron beam of an electron beam device independently of changes in ambient operating conditions and of changes in a characteristic of the power supplied to said device comprising, a power supply, an electron beam device having means actuated by said power supply to generate a beam of electrons, first and second means to focus said beam to a spot, said first focusing means being connected to derive power from said power supply, an amplifier having an input coupled in circuit with said first focusing means and an output coupled to said second focusing means to maintain said beam in focus independently of any change in the magnitude of said characteristic, said amplifier comprising an electron discharge device having at least plate, cathode and grid electrodes, said input being coupled to said grid electrode and said output being derived from said plate electrode, an impedance element connected between said plate electrode and a first terminal of said power supply, means returning said cathode to a second terminal of power supply, and a gain stabilizing voltage divider network connected in parallel with said plate-cathode circuit between said terminals of said power supply, said voltage divider network comprising a first resistance and a reverse biased diode connected between said first terminal and said grid and a second resistance connected between said grid and said second terminal, the ratio of said second resistance to the sum of said first and second resistances being proportional to the reciprocal of the gain of said amplifier stage.

7. In a television camera circuit including a camera tube having a screen, means for impinging a cathode ray beam on said screen including a focusing coil for producing a magnetic field parallel to the axis of said tube and a focusing electrode in said tube, and deflection coils for producing magnetic fields transverse to said axis to control movement of said beam, said focusing and deflection coils being wound of wire of the same material having the same temperature coefficient of resistance, horizontal and vertical sweep circuits connected to said deflection coils to cause the beam to scan a certain area of said screen in a certain regular pattern, a resistor in series with said focusing coil, a direct current power supply arranged to develop two output voltages having a fixed proportion to one another irrespective of variations therein, connection means applying one of said output voltages to operate said sweep circuit and the other of said output voltages to said focusing coil in series with said resistor, said resistor and said connection means having resistances substantially independent of circuit flow therethrough, whereby the currents through said focusing and deflection coils are maintained in fixed proportion irrespective of variation in said output voltages and in ambient temperature, an amplifier device connected to said power supply and having an input responsive to the voltage across said resistor and an output applied to said focusing electrode to maintain a proportionate relationship between focusing coil current and focusing electrode voltage, whereby both focus and the size of said scanned area are maintained substantially constant irrespective of variations in ambient temperature and supply voltage.

References Cited in the file of this patent

UNITED STATES PATENTS 2,430,331 Galella et al. ............ Nov. 4, 1947